United States Patent
Hochmuth

(10) Patent No.: US 6,568,759 B1
(45) Date of Patent: May 27, 2003

(54) ADJUSTMENT DEVICE, ESPECIALLY FOR ADJUSTING A SEAT IN A MOTOR VEHICLE

(75) Inventor: Harald Hochmuth, Hagenbuchach (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/856,256

(22) PCT Filed: Sep. 18, 1999

(86) PCT No.: PCT/EP99/06934

§ 371 (c)(1),
(2), (4) Date: Jun. 12, 2001

(87) PCT Pub. No.: WO00/32440

PCT Pub. Date: Jun. 8, 2000

(30) Foreign Application Priority Data

Nov. 27, 1998 (DE) .......................................... 198 54 931

(51) Int. Cl.⁷ ............................. B60N 2/22; B60N 2/235
(52) U.S. Cl. ......................... 297/367; 297/369; 297/373
(58) Field of Search ................................ 297/367, 369, 297/373

(56) References Cited

U.S. PATENT DOCUMENTS

| 2,209,122 A | | 7/1940 | Houplain |
| 2,559,960 A | | 7/1951 | Houplatn |
| 3,243,023 A | | 3/1966 | Boyden |
| 3,319,747 A | | 5/1967 | Lauper |
| 3,648,813 A | | 3/1972 | Walters et al. |
| 6,212,965 B1 | * | 4/2001 | Hochmuth ............... 297/367 X |
| 6,296,311 B1 | * | 10/2001 | Bonk et al. .................. 297/367 |

FOREIGN PATENT DOCUMENTS

| DE | 359468 | 9/1922 |
| DE | 1106138 | 5/1961 |
| DE | 3734363 | 4/1989 |
| DE | A1 3734363 | 4/1989 |
| DE | 4134353 | 9/1992 |
| DE | 4321335 | 1/1995 |
| DE | 9408426 | 8/1995 |
| DE | 4447480 | 6/1996 |
| DE | 19518424 | 11/1996 |
| EP | 0370502 | 5/1990 |
| EP | A1 0631901 | 1/1995 |
| EP | 0751030 | 1/1997 |
| FR | 0071501 | 2/1983 |

* cited by examiner

Primary Examiner—Peter M. Cuomo
Assistant Examiner—Rodney B. White
(74) Attorney, Agent, or Firm—Muserlian, Lucas and Mercanti

(57) ABSTRACT

An adjusting device for carrying out an adjusting function particularly for adjusting a seat of a motor vehicle comprising a housing (5) and a pivoting lever (3) whose one end is applied to a clamping roller switch gear (1) arranged in the housing (5) and comprising drive element (10), which is pivotable by the pivoting lever (3), and a driven element wherein for entraining the driven element, clamping rollers (39) adapted to be clamped between the drive element (10) and the driven element which is mounted on the housing (5) in radial direction through a radial bearing (18), further comprising a switchable clamping roller locking gear (2) arranged within the hosing (5) and whose driven shaft (4) is adapted to be coupled to the driven coupling ring 15 of the clamping roller switch gear 91) for transmitting a rotary motion from the clamping roller switch gear (1) to the clamping roller locking gear (2), wherein clamping rollers (19) are adapted to be clamped between the driven shaft (4) of the clamping roller locking gear (2) and the housing (5), and the driven shaft (4) of the clamping roller locking gear (2) is mounted on the housing (5) in radial direction through a radial bearing (25).

7 Claims, 4 Drawing Sheets

ADJUSTMENT DEVICE, ESPECIALLY FOR ADJUSTING A SEAT IN A MOTOR VEHICLE

The present invention concerns an adjusting device for carrying out an adjusting function. Adjusting devices of this type are used, for example, as seat adjusters in motor vehicles. The present invention particularly concerns those adjusting devices in which a clamping roller switch gear and a switchable clamping roller locking gear are coupled to each other.

The clamping roller switch gear is an infinitely variable step-by-step switch gear with which a motor vehicle seat, for example, can be adjusted. A drive element and a driven element define, together with opposing clamping surfaces, wedge-shaped clamping gaps which taper in opposite directions and in which clamping rollers are arranged. Housing-fixed stops are provided which keep the clamping rollers disengaged from the clamping surfaces when the drive element of the clamping roller switch gear is not activated. In this way, it is assured that the driven element is rotatable in an idling or in an initial position of the drive element. If the drive element is moved out of its initial or idling position, the drive element effects a work stroke. The return movement of the drive element into the initial position is an idling stroke during which the driven element is not activated. During the work stroke of the drive element in the one direction, the one clamping rollers are brought into clamping engagement with the clamping surfaces, while the respective other clamping rollers are fixedly supported on the housing and remain disengaged from the clamping surfaces. During the idling stroke, those clamping rollers that were previously clamped are disengaged from the clamping surfaces due to the reversal of movement, while the other clamping rollers remain supported on the housing-fixed stops and disengaged from the clamping surfaces even during the idling stroke. Therefore, no entrainment of the driven element takes place during the idling stroke.

The switchable clamping roller locking gear is connected to the driven element of the clamping roller switch gear so that a rotation of the driven element of the clamping roller switch gear causes an entrainment of the driven shaft of the switchable clamping roller locking gear. When the clamping roller switch gear is not activated, the switchable clamping roller locking gear effects that a torque introduced into the driven shaft of the locking gear from the outside is transmitted to a housing which is preferably fixed on a frame. This is possible because clamping rollers arranged between the driven shaft of the clamping roller locking gear and the housing are in a state of locking readiness with their clamping surfaces in both directions of rotation. The clamping surfaces are arranged on the housing and the driven shaft and define clamping gaps for the clamping rollers. In the case of a motor vehicle seat, the torque applied from the outside to the driven shaft is produced by the weight of the seat or by spring forces and/or the weight of a person occupying the seat. The switchable clamping roller locking gear therefore prevents an accidental variation in the height of the seat.

BACKGROUND OF THE INVENTION

One example of an adjusting device, particularly for a motor vehicle seat is known from EP 0 631 901 B1. Among other things, an adjusting device is disclosed in which a clamping roller switch gear (FIGS. 2 and 3 of EP 0 631 901 B1) and a switchable clamping roller locking gear (FIG. 13 of EP 0 631 901 B1) are coupled to each other. A pivoting lever of the clamping roller switch gear comprises a substantially circular recess into which an inner element engages. In the annular space defined between the inner element and the wall of the recess, a plurality of circumferentially spaced clamping rollers are arranged that are spring-biased against housing-fixed stops. A plurality of circumferentially spaced radial constrictions of the annular space are formed by an appropriate shaping of the recess, so that the wall of the recess and the outer peripheral surface of the inner element define wedge-shaped clamping gaps in which the clamping rollers are arranged. The inner element is rotationally fixed to dogs that engage between clamping rollers of the switchable clamping roller locking gear as will be described more closely below.

The housing-fixed stops for the clamping rollers of the clamping roller switch gear at first effect that the clamping rollers of the clamping roller switch gear remain disengaged from their clamping surfaces when the pivoting lever is not activated, i.e. when it is in its idling initial position. The pivoting lever can be pivoted in both directions of rotation out of its initial idling position, a pivoting in one of the two directions of rotation being called a work stroke and a pivoting of the lever back into its initial position being called an idling stroke. In the prior art adjusting device, a work stroke in clockwise direction causes the clamping rollers situated on the right-hand side of the housing-fixed stops to be drawn into their clamping gaps so that the inner element can be pivoted together with the pivoting lever. Due to this pivoting motion, the clamped clamping rollers approach the other clamping rollers situated on the left-hand side of the housing-fixed stops. This course of movement is due to the fact that the clamping rollers on the left-hand side are supported on the housing-fixed stops and are retained in a state of disengagement from their clamping surfaces. Thus, during the work stroke, the pivoting lever and the inner element are pivoted in common past the clamping rollers that are supported on the housing. When the pivoting lever is released, the previously clamped clamping rollers slip or roll out of clamping engagement due to the changed direction of pivot of the pivoting lever. The other clamping rollers are not yet in clamping engagement because the associated clamping ramps that are disposed on the pivoting lever are at a distance from these clamping rollers. Therefore, during this idling stroke, no rotation of the inner element takes place. A renewed displacement of the pivoting lever out of its initial position in clockwise direction therefore effects a further rotation of the driven shaft in clockwise direction.

The inner element comprises dogs (FIG. 13 of EP 0 631 901 B1), each of which engages between two peripherally adjacent clamping rollers of the switchable clamping roller locking gear. The clamping rollers are arranged in an annular space defined between a stationary housing and a driven shaft, wedge-shaped clamping gaps for the clamping rollers being defined between the cylindrical inner wall of the housing and the clamping ramps of the driven shaft. The clamping rollers are biased by compression spring into their clamping gaps so that a permanent locking readiness is assured. A rotation of the dogs causes the one clamping rollers to be pressed out of the associated clamping gaps so that a rotation of the driven shaft of the switchable clamping roller locking gear can take place. The driving power transmitted by the dogs is introduced into the driven shaft of the switchable clamping roller locking gear by the clamping rollers. The rotation of the driven shaft serves to adjust the seat.

In the adjusting device described above, it must be assured that the inner element of the clamping roller switch gear is perfectly mounted because this inner element is vital to the functioning of the clamping roller switch gear and for the functioning of the switchable clamping roller locking gear. If this inner element is not properly mounted, it is possible, for example, for the inner element to tilt so that, on the side of the switchable clamping roller switch gear, the wedge-shaped clamping gaps get altered and, on the side of the switchable clamping roller locking gear, the point of application of the dogs on the clamping rollers is changed. Both consequences are disadvantageous because they can lead to a malfunctioning of the machine elements or even to a complete failure of the adjusting device. The discussed prior art offers no solution that assures that the inner element of the clamping roller switch gear is properly mounted with a view to the functioning of the damping roller switch gear of the switchable clamping roller locking gear.

SUMMARY OF THE INVENTION

The object of the invention is therefore to provide an adjusting device for carrying out an adjusting function that assures that the driven element of the clamping roller switch gear is perfectly mounted. In the adjusting device of the invention, a common housing is provided for the clamping roller switch gear and the switchable clamping roller locking gear, and the driven element of the clamping roller switch gear is mounted on the housing in radial direction through a radial bearing, and the driven shaft of the switchable clamping roller locking gear is mounted on the housing in radial direction through a further radial bearing.

The invention can also be described in other words, viz., the driven element of the clamping roller switch gear and the driven shaft of the clamping roller locking gear are both centered on the common housing. This means that the driven element of the clamping roller switch gear and the driven shaft of the clamping roller locking gear are perfectly centered relative to each other. The primary purpose served by the radial bearings therefore is that of a proper centering. Consequently, the sliding bearing surfaces of the radial bearings can also be designated as centering surfaces that are suitable for sliding contact. An outer peripheral surface of a cylindrical pin that is only in line contact with another surface can also be considered as a centering surface.

The radial bearing of the driven element of the clamping roller switch gear can be configured so that the driven element cannot tilt. In this way, it is assured that the driven element of the clamping roller switch gear is both perfectly positioned and mounted in radial direction. Due to the fact that the driven shaft of the clamping roller locking gear comprising the clamping ramps is likewise mounted in the housing and because the clamping rollers are spring-biased against these clamping ramps, there is a total guarantee that the driven element of the clamping roller switch gear, with the claws preferably disposed thereon, is perfectly positioned relative to the clamping rollers of the clamping roller locking gear because the support and centering both of the driven element of the clamping roller switch gear and of the driven shaft of the clamping roller locking gear is realized on a common housing. It is no problem to configure the support and mounting surfaces in a desired relative position to each other on the housing. The housing can be totally closed except for one entrance for the connection of the pivoting lever and one exit for the driven shaft of the clamping roller locking gear. The housing protects the clamping roller switch gear and the clamping roller locking gear from the penetration of undesired foreign matter that could impair the operation of these machine elements. The housing can have a pot-shaped outer appearance, all sharp-edged parts being contained within the housing. In this way, a risk of injury, for example by slipping off the pivoting lever, is reduced.

In place of the clamping rollers described here by way of example, it is also possible to use clamping balls or clamping wedges. The radial bearings may be configured both as sliding bearings and as rolling bearings.

The driven element of the clamping roller switch gear preferably comprises a coupling ring that is radially mounted in the housing, preferably for rotation about the axis of rotation of its radial bearing, said coupling ring defining together with clamping ramps of the drive element, wedge-shaped clamping gaps in which the clamping rollers are disposed. The coupling ring can comprise, for example, a hollow cylindrical extension whose outer peripheral surface is in sliding contact with a cylindrical inner wall of the housing and whose inner peripheral surface defines a cylindrical clamping track for the clamping rollers.

The coupling ring preferably comprises claws that serve to release the clamping rollers of the clamping roller locking gear and to positively entrain the driven shaft of the clamping roller locking gear. The claws therefore project towards the clamping roller locking gear and can engage between the clamping rollers of the clamping roller locking gear. In this arrangement, the coupling ring of the clamping roller switch gear and the driven shaft of the clamping roller locking gear are arranged coaxially to each other. For a transmission of power from the clamping roller switch gear to the clamping roller locking gear, the claws of the coupling ring at first disengage the clamping rollers of the clamping roller locking gear out of clamping engagement with the clamping surfaces and then come to abut against the driven shaft of the clamping roller locking gear to positively entrain the driven shaft. In contrast to the aforesaid prior art, in the case of the invention, power is therefore transmitted directly from the coupling ring of the clamping roller switch gear to the driven shaft of the clamping roller locking gear, that is to say, power is not transmitted through the clamping rollers of the clamping roller locking gear.

The clamping rollers of the clamping roller locking gear are normally spring-biased against a cylindrical clamping track. This cylindrical clamping track can at the same time be a sliding bearing surface for the coupling ring of the clamping roller switch gear. This is the case when the peripheral surfaces of the claws bear against the cylindrical clamping track. These peripheral surfaces form a radial bearing with the cylindrical clamping track. This radial bearing may replace or supplement the radial bearing between the coupling ring and the housing described above.

According to a further feature of the invention, the drive element of the clamping roller switch gear comprises a switch disk that is connected rotationally fast to the pivoting lever, and the drive element further comprises two drive members that are pivotable in opposite directions, preferably about the axis of rotation of the radial bearing. One of these drive members is positively entrained by the switch disk in the one direction of rotation, and the other of these drive members is positively entrained by the switch disk in the other direction of rotation. When the pivoting lever is moved out of its neutral initial position in one direction, one of the two drive members is positively entrained in the selected direction while the respective other drive member is fixedly supported on the housing.

Preferably, both the drive members of the clamping roller switch gear comprise clamping ramps for the clamping rollers and each of the two drive members is radially mounted on the coupling ring through a radial bearing. If the coupling ring comprises a cylindrical clamping track for the clamping rollers, this clamping track and the clamping ramps of the drive members define wedge-shaped clamping gaps for the clamping rollers. Since, in addition, the drive members are radially mounted and centered on the coupling ring, these wedge-shaped clamping gaps can be defined very exactly. Preferably, an inner wall of the coupling ring defines a cylindrical clamping track for the clamping rollers and also a sliding bearing surface for the radial bearing.

If both drive members of the clamping roller switch gear comprise a plurality of circumferentially spaced clamping ramps which together with the cylindrical clamping track of the coupling ring define wedge-shaped clamping gaps in which the clamping rollers are disposed, it is particularly advantageous if the clamping gaps defined by the clamping ramps of the one drive member taper in the one peripheral direction and the clamping gaps defined by the clamping ramps of the other drive member taper in the opposite peripheral direction. When a clamping engagement of the clamping rollers takes place in this arrangement, only one of the two drive members is entrained in a selected direction of rotation in each case.

BRIEF DESCRIPTION OF THE DRAWINGS

The invention will be described in the following with reference to two examples of embodiment represented in a total of seven figures.

DETAILED DESCRIPTION OF THE DRAWINGS

Figure 1:
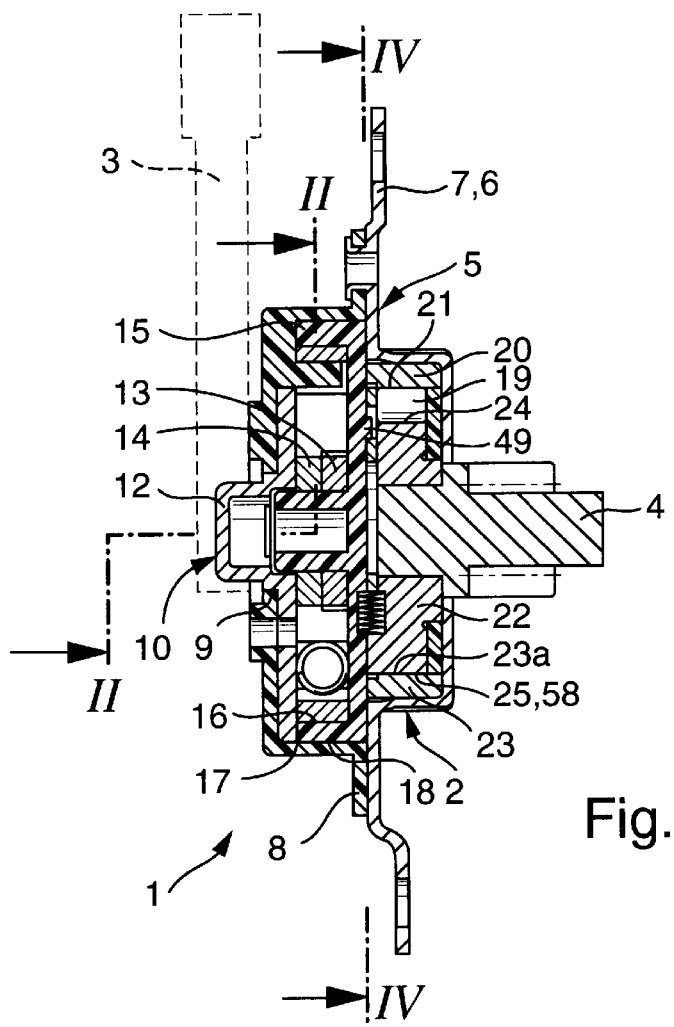
FIG. 1 is a longitudinal section through an adjusting device according to the invention.

FIG. 1 shows an adjusting device according to the invention for adjusting a seat of a motor vehicle. A damping roller switch gear 1 and a switchable clamping roller locking gear 2 are coupled to each other in such a manner that a pivoting motion of a pivoting lever 3 is transmitted through the clamping roller switch gear 1 to a driven shaft 4 of the switchable clamping roller locking gear 2. The clamping roller switch gear 1 and the switchable clamping roller locking gear 2 are arranged in a common housing 5. The housing 5 generally comprises a housing bottom 6 with screwing flanges 7 and further comprises a housing cover 8 which, in the present example of embodiment, is made of a plastic. The housing cover 8 comprises an opening 9 for a drive element 10 of the clamping roller switch gear 1. The housing bottom 6 comprises a further opening 11 for the driven shaft 4 of the switchable clamping roller locking gear 2.

The drive element 10 comprises a switch disk 2 that is connected rotationally fast to the pivoting lever 3. The drive element 10 further comprises two drive members 13, 14 that are connected to the switch disk 12 for pivoting motion. The driver element 10 also comprises a coupling ring 15 that connects the clamping roller switch gear 1 and the switchable clamping roller locking gear 2 to each other for the transmission of a pivoting motion. A cylindrical inner wall of the housing cover 8 and a cylindrical outer peripheral surface of the coupling ring 15 are configured as sliding bearing surfaces 16, 17 that are in sliding contact with each other. In this way, a radial bearing 18 is formed on which the coupling ring 15 is mounted radially on the housing 5, and the radial bearing 18 prevents a tilting of the coupling ring 15. The axis of rotation of the radial bearing 18 coincides with the axis of rotation of the two drive members 13, 14, with that of the switch disk 12 and with that of the pivoting lever 3 as well as with that of the driven shaft 4 of the switchable clamping roller locking gear 2.

Clamping rollers 19 are arranged between the driven shaft 4 of the clamping roller locking gear 2 and the housing 5. A clamping ring 20 is connected rotationally fast to the housing 5, and the inner peripheral surface of the clamping ring 20 defines a cylindrical clamping track 21 for the clamping rollers 19. The driven shaft 4 comprises a plurality of circumferentially spaced cams 22 whose peripheral surfaces are configured as sliding surfaces 23 which are in sliding contact with the inner peripheral surface of the clamping ring 20, which surface is configured as a sliding bearing surface 23a. The driven shaft 4 further comprises a plurality of circumferentially spaced clamping ramps 24 which, together with the cylindrical clamping track 21 of the clamping ring 20 form wedge-shaped clamping gaps into which the clamping rollers 19 are spring-biased. The radial bearing 25 formed by the sliding bearing surfaces 23 of the cams 22 and the sliding bearing surface 23a of the clamping ring 20 serves for the radial mounting of the driven shaft 4 in the housing 5, and this radial bearing 25 is configured so that a tilting of the driven shaft 4 is excluded. The inner peripheral surface of the clamping ring 20 serves both as a sliding bearing surface 21 and as a clamping track.

Figure 2:
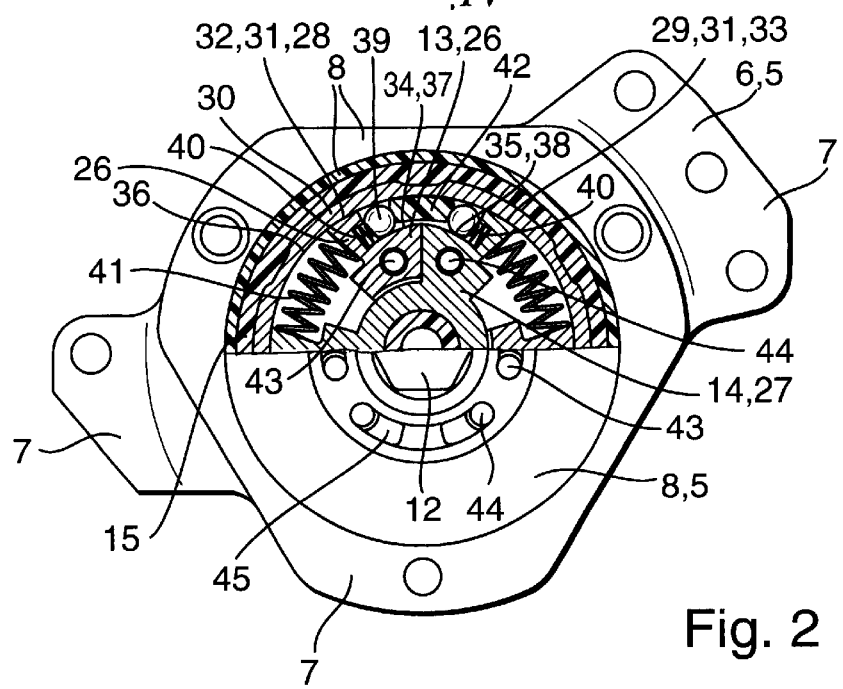
FIG. 2 is a cross-section through the adjusting device of FIG. 1 taken along line II—II.

FIG. 2 shows a cross-section taken along the line II—II. Clearly to be seen are the two drive members 13, 14 that are arranged axially behind each other. Each of the drive members 13, 14 comprises three circumferentially equi-spaced fingers 26, 27 which engage each other in peripheral direction with switching clearance. The two drive members 13, 14 can be rotated against each other till the inter-engaging fingers 26, 27 come to abut against each other. Each of the drive members 13, 14 is radially mounted and centered on the coupling ring 15 through a radial bearing 28, 29. For this purpose, a ring 30 is fixed rotationally fast to the coupling ring 15 and its inner peripheral surface forms a sliding bearing surface 31. The peripheral surfaces of the fingers 26, 27 comprise respective sliding bearing surfaces 32, 33 which are in sliding contact with the sliding bearing surface 31 of the ring 30. Adjacent fingers 26, 27 of the drive members 13, 14 comprise clamping ramps 34, 35 which together with the inner peripheral surface of the ring 30 which is configured as a cylindrical clamping track 36 define wedge-shaped clamping gaps 37, 38 in which clamping rollers 39 are arranged. The clamping rollers 39 are biased by compression springs 40 into their wedge-shaped clamping gaps 37, 38. The compression springs 40 are supported at one end on a finger 26 or 27 and at the other end, on a clamping roller 39. Further compression springs 41 are arranged between adjacent fingers 26, 27 of the two drive members 13, 14. These compression springs 41 are supported at one end on one of these fingers and at the other end, on the other of these fingers 26 and 27.

Tongues 42 that are fixedly connected to the housing cover 8 engage between two adjacent clamping rollers 39 and form a support for these clamping rollers 39. The tongues 42 are dimensioned so that in the position illustrated in this figure, the clamping rollers 39 are disengaged from the clamping ramps 34, 35 and from the cylindrical clamping track 36. These tongues 42 define first housing-fixed stops.

Figure 3:
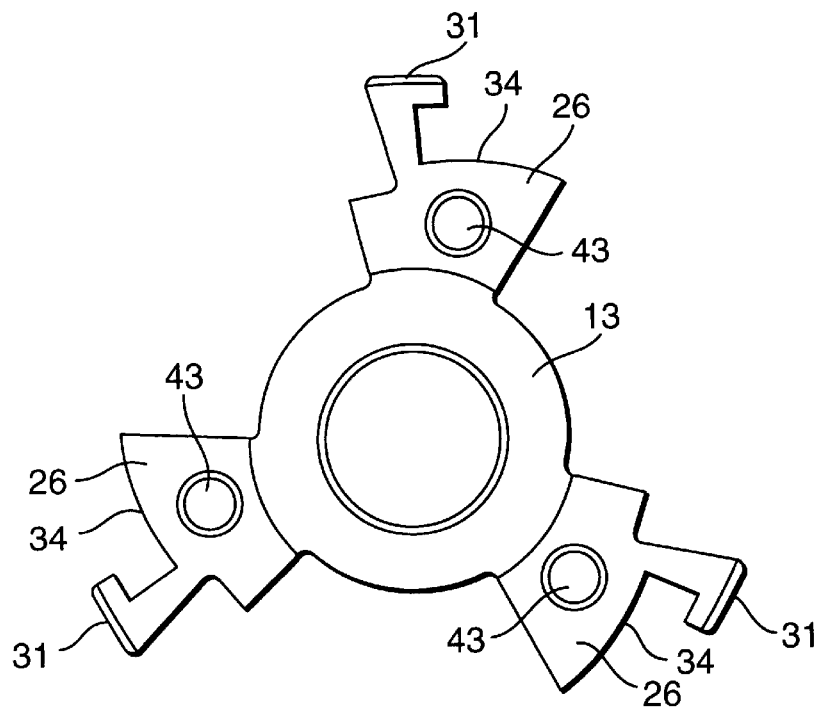
FIG. 3 is a view of a drive member.
Figure 4:
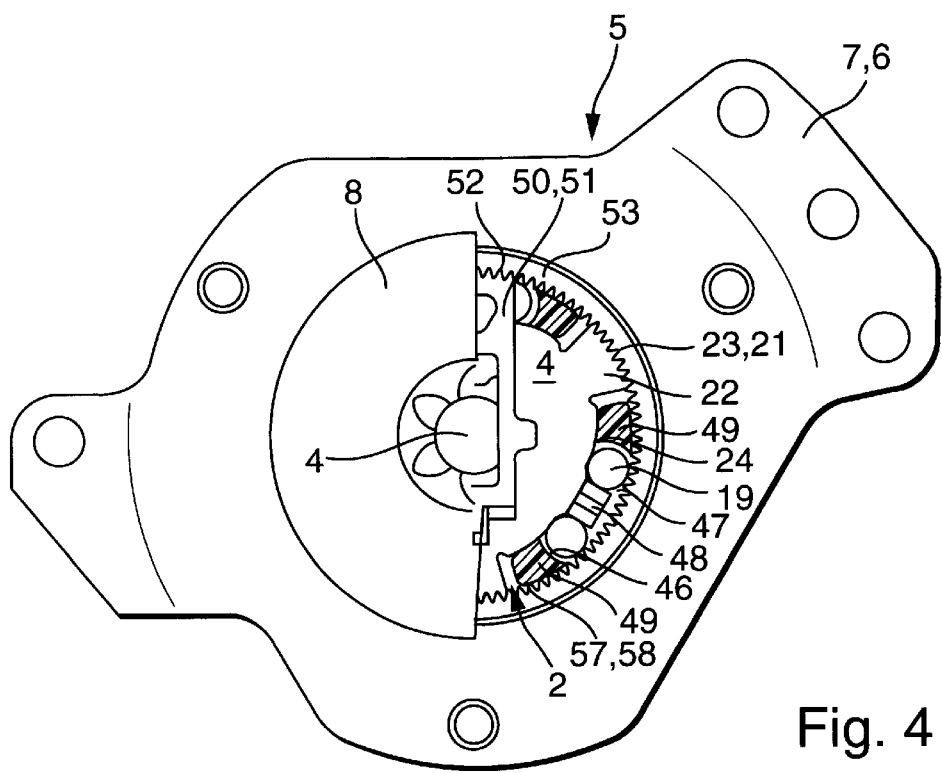
FIG. 4 is a further cross-section taken along line IV—IV through the adjusting device according to the invention shown in FIG. 1.

Each of the drive members 13, 14 is fixedly connected to pins 43, 44 that protrude from an end face thereof and engage into slots 45 of the housing cover 8. These pins 43, 44 also engage into slots of the switch disk 12 as will be described more particularly below. FIG. 3 is a detail drawing of the drive member 13. FIG. 4 shows a semi-section taken along line III—III of FIG. 1 and gives a clear view of the switchable clamping roller locking gear 2. The clamping rollers 19 are biased by compression springs 48 into their wedge-shaped clamping gaps 46, 47 that are defined by the clamping ramps 24 and the cylindrical clamping track 21. Claws 49 that are fixedly connected to the coupling ring 15 engage between the clamping rollers 19.

Further, an anti-slip device 50 is provided that comprises a slide 51 that is rotationally fixed to the driven shaft 4 but is radially movable. Teeth 52 of the slide 51 can be made to mesh with a rim gear 53 of the housing 5.

Figure 5:
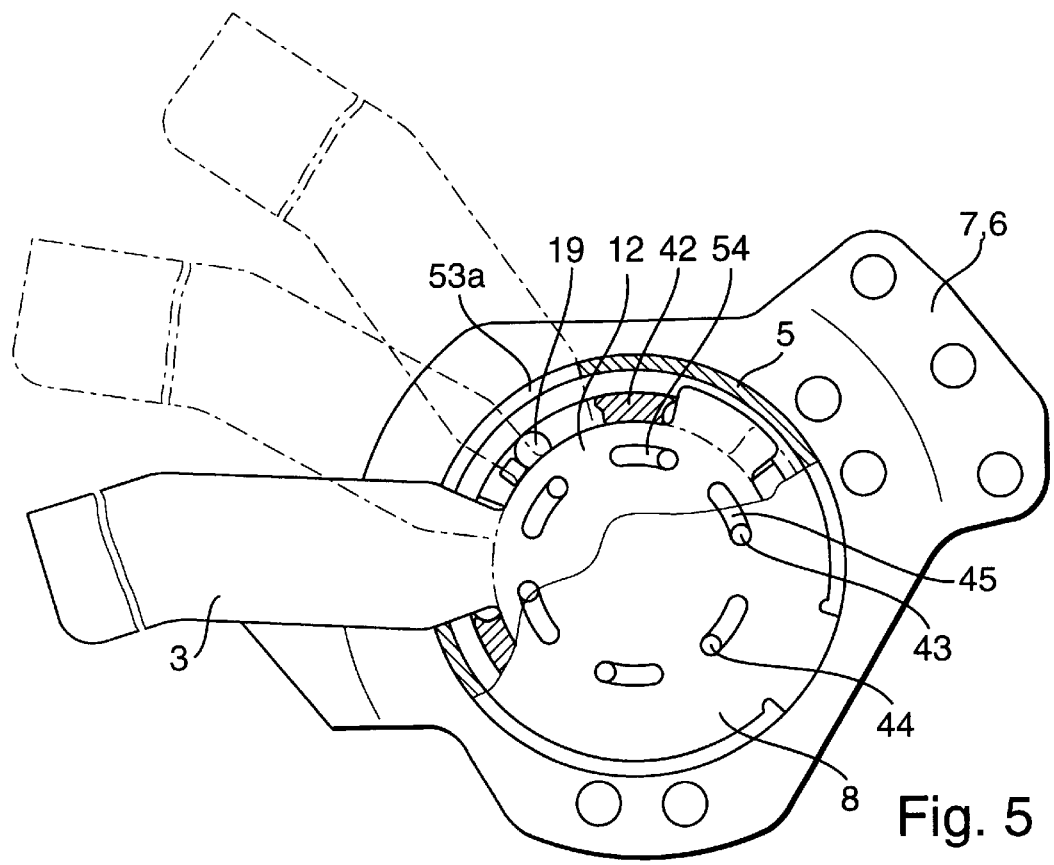
FIG. 5 is a cross-section through a further adjusting device according to the invention.

FIG. 5 shows another embodiment of the adjusting device of the invention which differs from the adjusting device described above mainly in that the pivoting lever 3 is made in one piece with the switch disk 12, the pivoting lever 3 being inserted radially through a slit 53a of the housing 5. The housing cover 8 has been partly broken off so that the switch disk 12 with the slots 54 can be clearly seen. In this figure, the slots 54 provided in the switch disk 12 for engagement by the pins 43, 44 are distinctly illustrated.

Three positions of the pivoting lever 3 are represented in this FIG. 5. The central, initial position of the pivoting lever 3 is shown in broken lines. From this position, the pivoting lever 3 can be displaced both in clockwise and in anti-clockwise direction. A displacement of the pivoting lever 3 out of the initial position effects a work stroke and a return movement into the initial position effects an idling stroke. The power generated by the actuation of the pivoting lever 3 is transmitted during the work stroke to the driven shaft 4 of the clamping roller locking gear 2.

Figure 6:
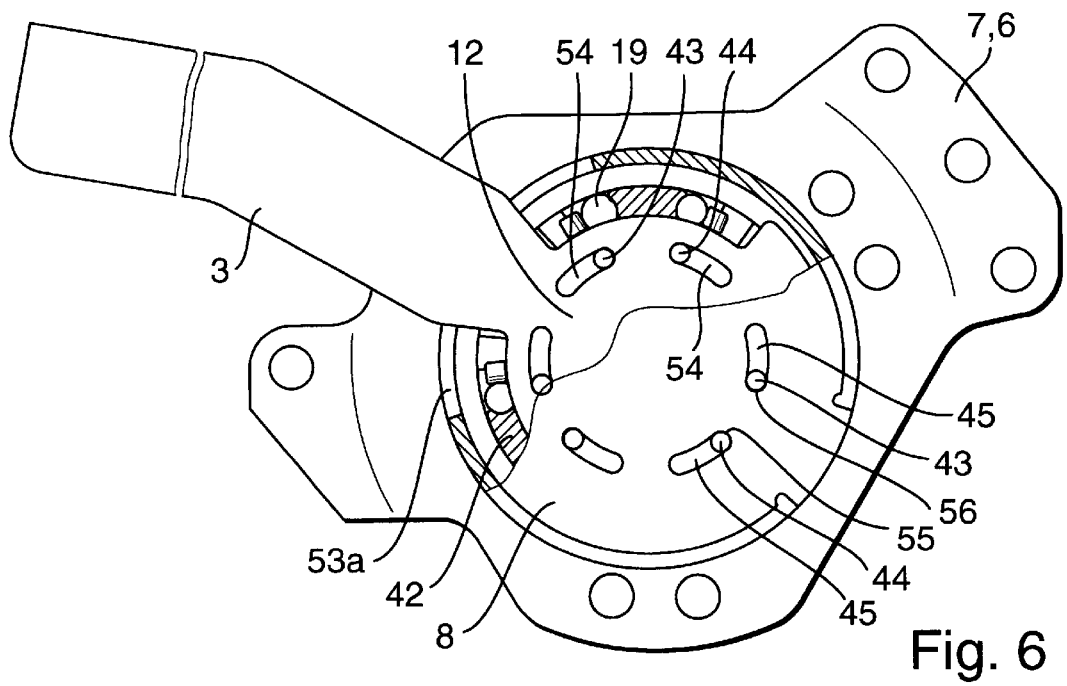
FIG. 6 shows the adjusting device of FIG. 5, but with the pivoting lever in an initial position.

The manner in which this power transmission is effected is explained in the following with reference to FIGS. 2, 5, 6 and 7. FIG. 6 shows the seat adjusting device of the invention of FIG. 5, but with the pivoting lever 3 in its initial position. Under the action of the compression springs 41 described above, the pins 43, 44 of the two drive members 13, 14 are biased against housing-fixed stops. The pins 44 are biased in anti-clockwise direction against the ends of the slots 45, so that these ends define second housing-fixed stops 55. The pins 43 of the drive member 13 are biased in clockwise direction against the other ends of the slots 45 so that these ends define third housing-fixed stops 56. Either a pin 43 of the drive member 13 or a pin 44 of the drive member 14 engages into each slot 45.

The slots 54 of the switch disk 12 are dimensioned so that in the initial position of the pivoting lever 3, the pins 43, 44 likewise bear against ends of the slots 54. In this way, the initial position of the pivoting lever 3 is distinctly defined. In this figure, the slots 45, 54 of the housing cover 8 and the switch disk 12 are situated exactly on top of each other.

Figure 7:
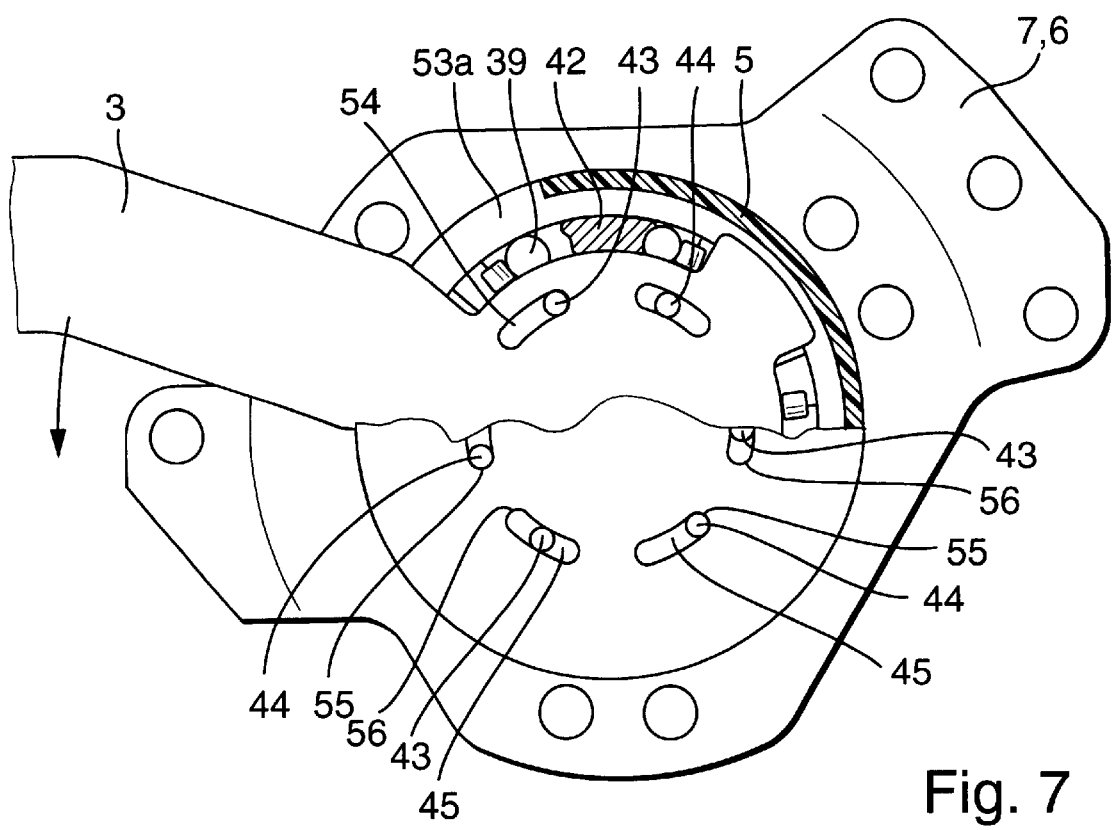
FIG. 7 is a view of the adjusting device of the invention similar to FIG. 6, but with the pivoting lever in a pivoted position.

FIG. 7 shows the adjusting device of FIG. 6, but with the pivoting lever moved out of its initial position in anti-clockwise direction, the end of the work stroke not yet being reached. It can be clearly seen in this figure that the pins 43 are positively entrained by the pivoting lever 3 because each of them bears against the end of a slot 54 of the switch disk 12. This means that the drive member 13 is likewise positively entrained. Since a relative movement now takes place between the drive member 13 and the coupling ring 15, the clamping rollers 39 of the clamping roller switch gear 1 are drawn into their wedge-shaped clamping gaps 37. For this reason, the coupling ring 15 pivots together with the drive member 13 and the pivoting lever 3. Due to the pivoting of the coupling ring 15, its claws 49 at first come to abut against the clamping rollers 19 of the switchable clamping roller locking gear 2 and release the clamping rollers 19 from clamping engagement. Following this, the claws 49 abut against further stops, not shown, of the driven shaft 4 so that the driven shaft 4 is positively rotated.

During this work stroke, the pins 44 and thus the drive member 14 remain supported on the second housing-fixed stops 55. As a result of this work stroke, the compression springs 41 are compressed because the drive member 13 is pivoted relative to the drive member 14 that is fixedly supported on the housing. The end of the work stroke (FIG. 7) is reached when the fingers 26 of the drive member 13 come to abut against the fingers 27 of the drive member 14. At the end of the work stroke, the compression springs 41 are not yet compressed to block size.

During the work stroke, the clamping rollers 39 associated to the drive member 14 that is fixedly supported on the housing remain in their wedge-shaped clamping gaps 38 and are supported at one end on the housing-fixed tongues 42 and at the other end, on the compression springs 40. The housing-fixed tongues 42 are dimensioned so that the clamping rollers 39 remain free of clamping engagement.

If the pivoting lever 3 is now released, it springs back into its initial position under the spring force of the compressed compression springs 41. These compression springs 41 relax till the pins 43 of the drive member 13 come to re-abut against their third housing-fixed stops 56. During this idle stroke, no rotation of the coupling ring 15 takes place because, due to the relative motion between the drive member 13 and the coupling ring 15, the previously clamped clamping rollers 39 are pressed into their wedge-shaped clamping gaps 37 so that a clamping engagement is impossible. A renewed displacement of the pivoting lever 3 in anti-clockwise direction effects a further rotation of the coupling ring 15 and thus of the driven shaft 4. For the functioning of the adjusting device of the invention, it is not necessary to carry out a complete work stroke. For example, the pivoting lever 3 may be displaced only through half of its possible work stroke. Corresponding to this, the entrainment of the coupling ring 15 and the driven shaft 4 is also reduced. If the pivoting lever 3 is released out of this intermediate position, it springs back into its initial position under the spring force of the compression springs 41.

A rotation of the driven shaft 4 in the opposite direction is possible when the pivoting lever 3 is displaced in clockwise direction out of its initial position. The transmission of power is effected in the same manner as described above.

A torque introduced into the driven shaft 4 from the outside in the initial position of the pivoting lever 3 is transmitted to the housing 5 by the clamping rollers 19 clamped in each case.

To prevent the clamped clamping rollers 19 of the clamping roller locking gear 2 from coming briefly loose from clamping engagement under the influence of vibrations, and thus possibly leading to a relative rotation between the housing 5 and the driven shaft 4, the anti-slip device 50 mentioned above is provided. When the pivoting lever 3 is in its initial position, the teeth 52 of the slide 51 are meshed with the rim gear 53. Thus, there is a positive connection between the driven shaft 4 and the housing 5. When the pivoting lever 3 is actuated, the slide 51 is moved radially inwards by a switching mechanism so that the teeth 52 are released from the meshed engagement with the rim gear 53.

The described radial bearings also serve to center the mounted parts. The pins 43, 44 and the slots 54 of the switch disk 12 can be matched to one another in a manner that permits a perfect centering of the switch disk 12 by the pins 43, 44.

The claws 49 of the coupling ring 15 bear with their outer peripheral surfaces against the housing-fixed cylindrical clamping track 21 of the clamping roller locking gear 2 (FIG. 4). In this way, it is assured that the claws 49 are perfectly centered and thus also perfectly oriented relative to the clamping rollers. Since the peripheral surfaces of the claws 49 slide along the cylindrical clamping track 21, these peripheral surfaces define sliding bearing surfaces 57 which, together with the cylindrical clamping track 21, form a radial bearing 58.

List of Reference Numerals 1 clamping roller switch gear
2 switchable clamping roller locking gear
3 pivoting lever
4 driven shaft
5 housing
6 housing bottom
7 screwing flange
8 housing cover
9 opening
10 drive element
11 opening
12 switch disk
13 drive member
14 drive member
15 coupling ring
16 sliding bearing surface
17 sliding bearing surface
18 radial bearing
19 clamping roller
20 clamping ring
21 cylindrical clamping track
22 cam
23 sliding bearing surface
23a sliding bearing surface
24 clamping ramp
25 radial bearing
26 finger
27 finger
28 radial bearing
29 radial bearing
30 ring
31 sliding bearing surface
32 sliding bearing surface
33 sliding bearing surface
34 clamping ramp
35 clamping ramp
36 cylindrical clamping track
37 clamping gap
38 clamping gap
39 clamping roller
40 compression spring
41 compression spring
42 tongue
43 pin
44 pin
45 slot
46 clamping gap
47 clamping gap
48 compression spring
49 claw
50 anti-slip device
51 slide
52 tooth
53 rim gear
53a slit
54 slot
55 second stop
56 third stop
57 sliding bearing surface
58 radial bearing

What is claimed is:

1. An adjusting device for carrying out an adjusting function for adjusting a seat of a motor vehicle, said device comprising a housing (5) and a pivoting lever (3) to which one end is applied to a clamping roller switch gear (1) that is arranged in the housing and comprises a drive element (10), which is pivotable by the pivoting lever (3), and a driven element, wherein for entraining the driven element, clamping rollers (39) can be clamped between the drive element (10) and the driven element which is mounted on the housing (5) in radial direction through a radial bearing (18), said device further comprising a switchable clamping roller locking gear (2) that is arranged within the housing (5) and a driven shaft (4) adapted to be coupled to the driven element coupling ring 15 of the clamping roller switch gear (1) for transmitting a rotary motion from the clamping roller to the clamping roller locking gear (2), wherein clamping rollers (19) are adapted to be clamped between the driven shaft (4) of the clamping roller locking gear (2) and the housing (5), and the driven shaft (4) of the clamping roller locking gear (2) is mounted on the housing (5) in radial direction through a radial bearing (25).

2. An adjusting device according to claim 1 wherein the driven element of the clamping roller switch gear (1) comprises a coupling ring (15) which is radially mounted on the housing (5) and which, together with clamping ramps (34, 35) of the drive element (10) defines wedge-shaped clamping gaps (37, 38) in which the clamping rollers (39) are arranged.

3. An adjusting device according to claim 2 wherein the coupling ring (15) comprises claws (49) which serve to release the clamping rollers of the clamping roller locking gear (2) and to enable a positive entrainment of the driven shaft (4) of the clamping roller locking gear (2).

4. An adjusting device according to claim 1 wherein the drive element (10) of the clamping roller switch gear (1) comprises a switch disk (12) that is connected rotationally positive to the pivoting lever (3), said drive element (10) comprising two drive members (13, 14) that are pivotable in opposite directions, and in one of said directions the switch disk (12) positively entrains one of the drive members (13), and in an opposite direction, the switch disk (12) positively entrains the other of the drive members (14).

5. An adjusting device according to claim 4 wherein each of the two drive members (13, 14) comprises clamping ramps (34, 35) for the clamping rollers (39) and each drive member (3, 14) is mounted radially on the coupling ring (15).

6. An adjusting device according to claim 5 wherein an inner wall of the coupling ring (15) defines a cylindrical clamping track (36) for the clamping rollers (39) and a sliding bearing surface (31) for the radial bearing (28, 29).

7. An adjusting device according to claim 4 wherein each of the two drive members (13, 14) of the damping roller switch gear (1) comprises a plurality of circumferentially spaced clamping ramps (34, 35) that together with the cylindrical clamping track (36) of the coupling ring (15) define wedge-shaped clamping gaps (37, 38) in which the clamping rollers (39) are arranged, the clamping gaps (37, 38) defined by the clamping ramps (34, 35) of one of the drive members (13, 14) taper in one peripheral direction and the clamping gaps (37, 38) defined by the clamping ramps (34, 35) of the other of the two drive members (13, 14) taper in an opposite peripheral direction.

* * * * *